W. M. WHEILDON.
SODA FOUNTAIN.
APPLICATION FILED SEPT. 7, 1911.
1,055,432.
Patented Mar. 11, 1913.
3 SHEETS—SHEET 1.
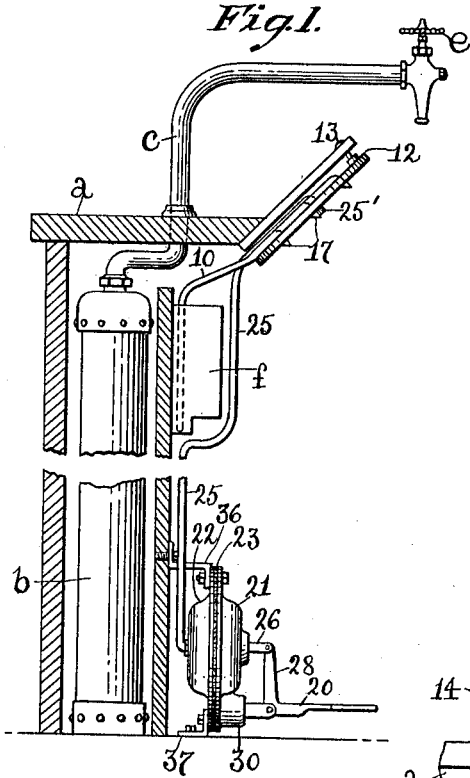
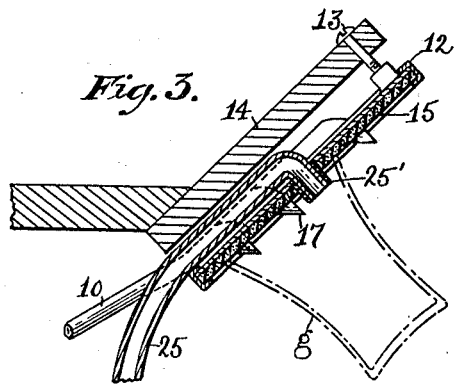
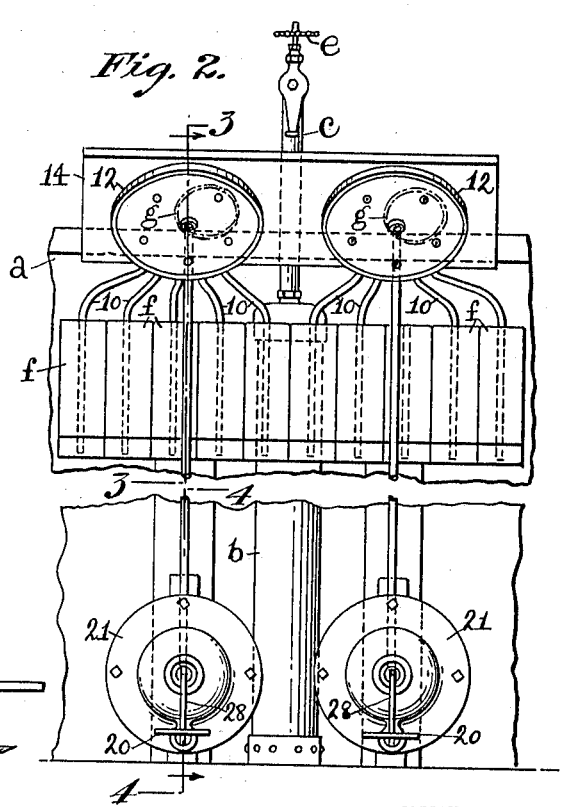
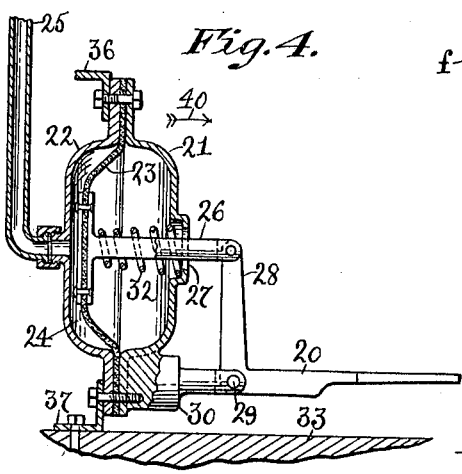
WITNESSES:
INVENTOR.
William M. Wheildon
BY
Jas. H. Churchill
ATTORNEY.

W. M. WHEILDON.
SODA FOUNTAIN.
APPLICATION FILED SEPT. 7, 1911.
1,055,432.
Patented Mar. 11, 1913.
3 SHEETS—SHEET 2.
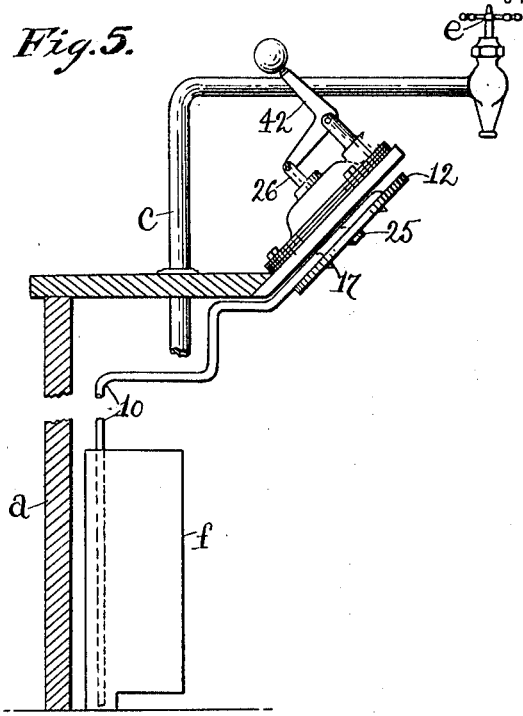
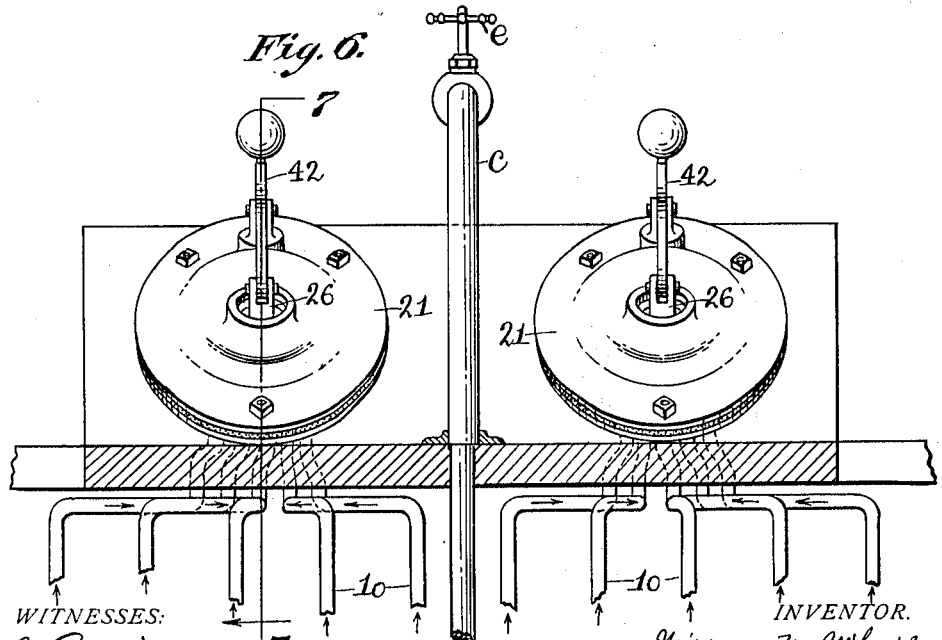
WITNESSES:
M. G. Crozier
J. Murphy
INVENTOR.
William M. Wheildon
BY
Jas. H. Churchill
ATTORNEY.

W. M. WHEILDON.
SODA FOUNTAIN.
APPLICATION FILED SEPT. 7, 1911.

1,055,432.

Patented Mar. 11, 1913.
3 SHEETS—SHEET 3.

WITNESSES:

INVENTOR.
William M. Wheildon
BY Jas. H. Churchill
ATTORNEY.

UNITED STATES PATENT OFFICE.

WILLIAM M. WHEILDON, OF ASHLAND, MASSACHUSETTS, ASSIGNOR TO AMERICAN SODA FOUNTAIN COMPANY, OF BOSTON, MASSACHUSETTS, A CORPORATION.

SODA-FOUNTAIN.

1,055,432. Specification of Letters Patent. Patented Mar. 11, 1913.

Application filed September 7, 1911. Serial No. 648,193.

*To all whom it may concern:*

Be it known that I, WILLIAM M. WHEILDON, a citizen of the United States, residing in Ashland, county of Middlesex, and State of Massachusetts, have invented an Improvement in Soda-Fountains, of which the following description, in connection with the accompanying drawings, is a specification, like letters on the drawings representing like parts.

This invention relates to apparatus with which liquid may be drawn by a vacuum pump from a container or vessel into a glass or other receptacle which forms a removable part of the connection between the said container and said pump.

The invention is especially applicable to a soda fountain for drawing syrups from a plurality of cans or containers, whereby each kind of syrup may be drawn into its own glass without being mixed with or coming in contact with any other kind of syrup. Provision is also made for enabling different syrups to be drawn into separate glasses substantially at the same time.

These and other features of this invention will be pointed out in the claims at the end of this specification.

Figure 7:
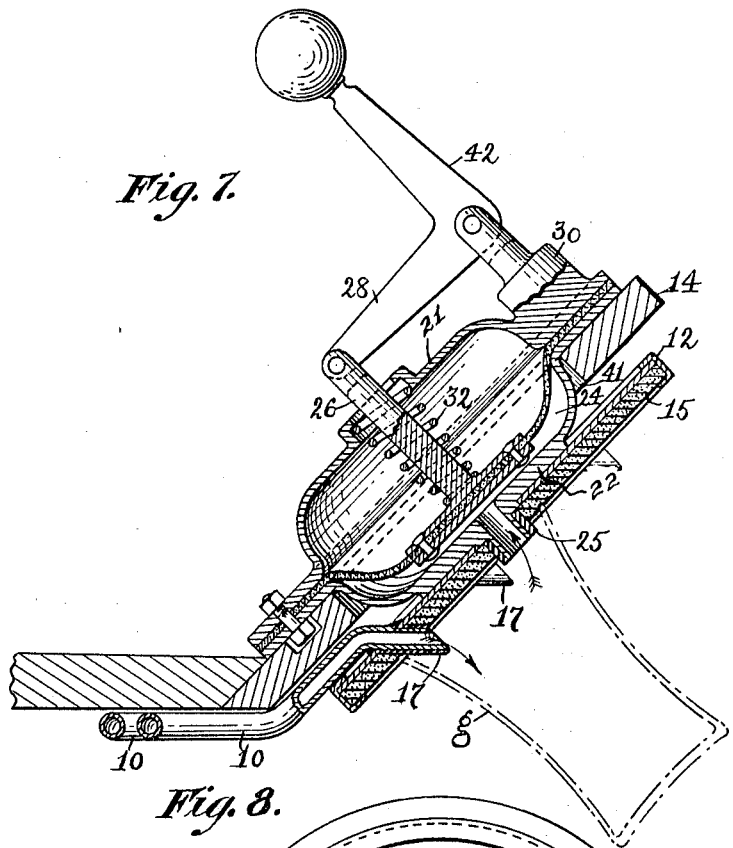
Figure 8:
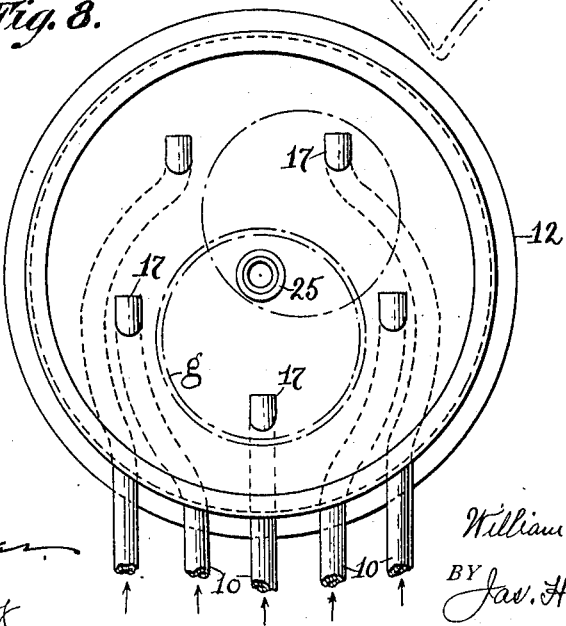

Figure 1 is a vertical section and elevation of an apparatus embodying this invention. Fig. 2, a rear elevation of the apparatus shown in Fig. 1. Fig. 3, a detail in section, taken on the line 3—3, Fig. 2. Fig. 4, a detail in section, taken on the line 4—4, Fig. 2. Fig. 5, an elevation and section of a modified form of apparatus. Fig. 6, a front elevation of the upper portion of the apparatus shown in Fig. 5. Fig. 7, an enlarged section taken on the line 7—7, Fig. 6, and Fig. 8, an underside view of the apparatus shown in Fig. 7.

Referring to Figs. 1 to 4, $a$ represents a soda fountain of any usual or suitable construction, such as now commonly used, it being provided with the charged water tank $b$, having the outlet pipe $c$ provided with the shut-off cock or valve $e$, and also with syrup containing cans or vessels $f$.

The present invention has for its object to provide means, whereby each of the syrups or other liquids contained in the different cans $f$ can be drawn into a glass $g$ without being mixed with or brought into contact with any of the other syrups or liquids, so that the syrup delivered to the customer is pure and its flavor uninfluenced by any other of said syrups. To this end, each of the syrup cans $f$ has its delivery pipe 10 connected with a head 12, which is shown in the present instance as circular in form and secured in any suitable manner to the fountain $a$, said head being shown as secured by screws or bolts 13 to an inclined bracket or slab 14 secured to or forming part of the fountain. The head 12 may and preferably will be provided with a facing 15 of rubber or other yielding material against which the glass $g$ may be pressed to form a fluid-tight joint. A plurality of the delivery pipes 10 from a plurality of cans $f$ are connected with the head 12 and are extended through the rubber facing 15 and terminate there, said pipes being open at the front surface of the facing 15 and may be provided with beveled ends, so that the lower half or portion of the outlet end of each pipe 10 will project beyond the facing and form a drip nozzle 17. The head 12 also has connected with it a suction pump, which is herein shown in Figs. 1, 2 and 4 as arranged to be operated by a foot treadle 20. The pump herein shown comprises a casing composed of two parts or halves 21, 22, having an interposed diaphragm 23, which forms with the part 22 of the casing a chamber 24, which is provided with an outlet and inlet port 25' at the front surface of the facing 15 of the head 12.

In the construction shown in Fig. 1, the chamber 24 is shown as connected by the pipe 25 with the head 12, said pipe being extended through the facing 15 and having its end open and terminating in proximity to the front surface of the facing 15 as shown in Figs. 2 and 3.

In the pump shown in Figs. 1 and 4, the diaphragm 23 has attached to it a stem or rod 26 which is extended through an opening 27 in the half 21 of the casing, and is connected with an arm 28 of the foot treadle 20, the latter being pivoted at 29 to a projection 30 on the casing. The diaphragm 23 is moved in one direction when the foot treadle 20 is depressed, and is moved in the opposite direction when the foot treadle is released by a spring 32 encircling the stem 26. The pump may be secured in a fixed position near the floor 33 of the building in which it is located, and is shown in Figs. 1 and 4 as secured to brackets 36, 37, which are secured to the fountain $a$ and the floor 33.

For sake of distinction, the tube or pipe 25 may be designated the suction tube or pipe for the pump, and the tubes or pipes 10 the liquid delivery pipes, which latter are arranged in the head 12 with relation to the suction pipe 25, so that the latter may coöperate with the liquid delivery pipes individually, whereby each delivery pipe may be connected with the pump by means of the glass tumbler or other receptacle *g* into which it is desired to draw the syrup or other liquid.

In operation, the glass *g* is placed with its mouth firmly pressed against the yielding facing 15 of the head 12 to make a fluid-tight joint, and so that the mouths of the suction pipe 25 and of one of the delivery pipes 10 are within the circumference of the glass, after the manner represented in Figs. 2 and 3. When the glass is thus placed, the operator depresses the treadle 20, which moves the diaphragm or piston 23 of the pump in the direction of the arrow 40, Fig. 4, and draws the air from the glass into the chamber 24 of the pump, thereby producing a sufficient vacuum in the glass to lift the syrup or other liquid from the can *f* with which is connected the delivery tube covered by the glass, and cause it to be discharged into the glass. As soon as the syrup has entered the glass, the operator releases the foot treadle, which allows the spring 32 to move the piston or diaphragm 23 back to its normal position shown in Fig. 4, thereby forcing the air back into the glass and breaking the vacuum therein, whereupon the glass is free to be removed from the head and placed under the outlet mouth of the draft tube *c* to receive the charged water. The air forced back into the glass also serves to force the liquid in the delivery pipe back into the container, thereby avoiding dripping of the liquid from the mouth of the delivery pipe after the glass has been removed.

In the arrangement shown in Figs. 1 and 2, the two heads 12 are secured to the bracket 14, and two pumps are connected with said heads, one for each, which arrangement leaves both hands of the operator free to draw two glasses of syrup at substantially the same time.

Instead of employing a pump operated by a foot treadle, the pump may be operated by hand after the manner represented in Figs. 5 to 8, wherein the pump is secured to the rear side of the bracket 14, which in this instance is provided with a suitable opening 41 through which the front half 22 of the pump casing is extended, and the head 12 is secured directly to the pump and is mounted on the suction pipe 25 of the pump. The pump piston rod or stem 26 is pivotally connected to a hand-operated lever 42.

The operation of the apparatus shown in Figs. 5 to 8 is the same as that shown in Figs. 1 to 4, except that the pump is operated by the hand of the operator grasping the hand lever 42.

It will be observed that the suction pipe of the pump is common to all the delivery pipes and is connected to each delivery pipe individually by the glass or other receptacle into which the desired syrup or other liquid is to be drawn. Furthermore, it will be observed, that there is no possibility of any one syrup being mixed with or its flavor changed by contact with any other syrup, inasmuch as the glass connects the suction pipe only with the delivery pipe for a particular syrup.

In the present instance, the heads 12 are shown as circular in form, but it is not desired to limit the invention in this respect, as the head may be of any desired form, providing the delivery pipes are arranged with relation to the suction pipe, so as to obtain the individual connection above described.

I have herein shown one form of suction pump, which I may prefer, but it is not desired to limit the invention to the particular form of pump herein shown.

It will be observed that the glass *g* or other receptacle forms a detachable connection between the suction pump and the can or receptacle containing the syrup or other liquid, and as I believe this feature to be new with me, I do not desire to limit the invention to any particular construction of apparatus in which it may be embodied.

Claims.

1. The combination with a soda fountain provided with a plurality of syrup containers having a delivery pipe leading from each container, of a head to which said delivery pipes lead, a facing of yielding material on said head, and a suction pump having its suction pipe connected with said head and located with relation to said delivery pipes to enable said suction pipe to be connected with the delivery pipes individually by means of a receptacle having its mouth applied to the yielding face of said head and into which the syrup is drawn by a vacuum created in said receptacle by said pump, substantially as described.

2. The combination with a soda fountain provided with a plurality of liquid containers having delivery pipes, of a head to which said delivery pipes lead, a suction pump located below said head and having its suction pipe connected with said head in such relation to said delivery pipes as to enable said suction pipe to be connected with a plurality of the said delivery pipes individually by the mouth of a receptacle into which the liquid from the selected container is drawn by a vacuum created in said receptacle by said pump, and a foot treadle to operate said pump, substantially as described.

3. The combination with a soda fountain having a head provided with a facing of yielding material, of a plurality of liquid containers having outlet pipes connected with said head and open at the front surface of said facing, a suction pump having a fluid inlet extended to the front surface of said yielding facing and arranged with relation to said outlet pipes to be connected with the same individually by the mouth of a glass applied to the yielding facing of said head, for the purpose specified.

4. The combination with a soda fountain provided with a plurality of liquid containers having a delivery pipe leading from each container, of a head to which said delivery pipes lead, and a suction pump having its suction pipe connected with said head and arranged with relation to a plurality of said delivery pipes to be connected with said delivery pipes individually by the mouth of a receptacle applied to said head and into which the liquid from a selected container is drawn by a vacuum created in the receptacle by said pump, substantially as described.

5. The combination with a soda fountain provided with a plurality of liquid containers having a delivery pipe leading from each container, of a head to which said delivery pipes lead, and a vacuum-producing means having its suction pipe connected with said head and arranged with relation to a plurality of said delivery pipes to be connected with said delivery pipes individually by the mouth of a receptacle applied to said head and into which the liquid from a selected container is drawn by a vacuum created in the receptacle by said vacuum producing means.

6. The combination with a liquid container having a delivery pipe, a head located at a higher level than said container and to which the said delivery pipe leads, and a manually operated vacuum pump having its suction inlet pipe connected with said head in proximity to said delivery pipe to be connected therewith by a receptacle, said pump acting to draw air from the said receptacle on one stroke to create a vacuum therein and cause liquid to flow from the container up through the delivery pipe into the said receptable and on the reverse stroke to force the air back into the receptacle and thereby prevent dripping of liquid from said delivery pipe when said receptacle is removed from said head, substantially as described.

7. The combination with a liquid container having a delivery pipe, a head to which said delivery pipe leads, and a manually operated vacuum pump having its suction inlet connected with said head in proximity to said delivery pipe to be connected therewith by a receptacle, said pump acting to draw air from the said receptacle on one stroke to create a vacuum therein and cause liquid to flow from the container through the delivery pipe into said receptacle, and on the reverse stroke to force the air back into the receptacle and thereby prevent dripping of liquid from said delivery pipe when said receptacle is removed from said head, for the purpose specified.

In testimony whereof, I have signed my name to this specification in the presence of two subscribing witnesses.

WILLIAM M. WHEILDON.

Witnesses:
 JAS. H. CHURCHILL,
 J. MURPHY.

---

Copies of this patent may be obtained for five cents each, by addressing the "Commissioner of Patents, Washington, D. C."